United States Patent [19]

Nakamura

[11] Patent Number: 4,942,477
[45] Date of Patent: Jul. 17, 1990

[54] IMAGE PICKUP PRINTING SYSTEM USING NON-NTSC SIGNALS

[75] Inventor: Shinya Nakamura, Shizuoka, Japan

[73] Assignee: Tokyo Electric Co., Ltd., Tokyo, Japan

[21] Appl. No.: 269,706

[22] Filed: Nov. 10, 1988

[30] Foreign Application Priority Data

Nov. 10, 1987 [JP] Japan .................................. 62-283697

[51] Int. Cl.$^5$ ........................... H04N 1/40; H04N 1/46
[52] U.S. Cl. ...................................... 358/401; 358/75; 358/438; 358/909
[58] Field of Search ...................... 358/80, 78, 75, 400, 358/401, 434, 438, 442, 444, 468, 909

[56] References Cited

U.S. PATENT DOCUMENTS 4,679,074  7/1987  Sugiura et al. ......................... 358/80
4,827,347  5/1989  Bell ...................................... 358/909

FOREIGN PATENT DOCUMENTS 60-20685  2/1985  Japan .
61-122882  8/1986  Japan .
61-189785  8/1986  Japan .

Primary Examiner—James J. Groody
Assistant Examiner—Randall S. Svihla
Attorney, Agent, or Firm—Oblon, Spivak, McClelland, Maier & Neustadt

[57] ABSTRACT

The invention provides an image pickup printing system which comprises an optical device for optically controlling an optical image of an object, an image pickup device disposed at the position of a focus of the optical device for converting an optical image into electric signals for a large number of divided dot-like regions on a plane, an image pickup device controller for controlling a manner in which electric signals produced by the image pickup device are to be taken out, so as to avoid NTSC signals and a printer device for printing out electric signals produced by the image pickup device. With the image pickup printing system, a hard copy can be printed by directly using signals obtained by the image pickup device.

2 Claims, 3 Drawing Sheets

IMAGE PICKUP PRINTING SYSTEM USING NON-NTSC SIGNALS

FIELD OF THE INVENTION AND RELATED ART STATEMENT

This invention relates to an image pickup printing system which involves a combination of a technique of a camera for taking a picture of an optical image of an object for photographing, a technique of an image sensor for converting an optical image into electric signals and a technique of a printer for printing out a picture image in response to electric signals.

Conventionally, means for converting an optical image of an object for photographing into electric signals and storing the electric signals therein are known and disclosed, for example, in Japanese Patent Laid-Open No. 60-20685 and Japanese Patent Laid-Open No. 61-189785. In the means thus disclosed, an image pickup device is a video camera and converted electric signals are video signals. Meanwhile, means disclosed in Japanese Utility Model Laid-Open No. 61-122882 converts an optical image into television signals similarly as in the preceding means.

In the devices described above, picture image signals of an electronic camera are stored as NTSC signals. Accordingly, there is a problem that, when it is intended to obtain a hard copy in accordance with such picture image signals, the NTSC signals must be converted into image signals for a printer. Accordingly, processing of picture image signals is complicated, and also the cost thereof is high.

Meanwhile, for the object of storage of picture image signals, a record medium such as a floppy disk must be used separately, and when the device is to be moved, also the record medium must be moved, which is inconvenient.

Subsequently, an example of conventional electronic camera system will be described with reference to FIG. 3. The electronic camera system includes a CCD (charge coupled device) 21 serving as an image pickup device, and an image pickup device controller 22 for controlling a manner in which signals produced by means of the CCD 21 are to be sent out.

The image pickup device controller 22 extracts electric signals, for example, for the first line from (1, 1) to (1, N) in series from electric signals produced by means of the CCD 21, then inserts a line feed signal, and then extracts signals for the second line from (2, 1) to (2, N) in series. In this manner, the signals finally to (M, N) are sent out in series. The electric signals converted in this manner are inputted to and stored in a memory 23.

The signals in the memory 23 are then sorted into RGB (red, green and blue) color signals, and color difference signals of R, G and B and luminance signals of Y are produced. Such color difference signals and luminance signals of Y are combined by a combining circuit with horizontal synchronizing signals, vertical synchronizing signals and color synchronizing signals produced by the image pickup device controller 22 so that they are converted into NTSC (National Television System Committee) signals.

In order to obtain a picture image as a hard copy 25 from such NTSC signals, the following procedure is normally taken. In particular, the NTSC signals are first converted into printer bit data, and signals for the first line from (1, 1) to (1, N) are extracted in series from the printer bit data and then a line feed signal is added before signals for the second line from (2, 1) to (2, N) are subsequently extracted in series. The signals of the lines of the printer bit data thus extracted with line feed signals individually added in this manner are then either printed directly on a printer 26 or stored once into a memory before they are printed.

Accordingly, such problems as described above are exhibited.

Objects and Summary of the Invention

It is a first object of the present invention to provide an image pickup printing system wherein picture image signals picked up by an image pickup device are readily converted into signals for a printer to obtain a hard copy.

It is a second object of the present invention to provide an image pickup printing system wherein a matter written on a blackboard or the like can be obtained readily as a hard copy.

In order to attain the objects, according to the present invention, there is provided an image pickup printing system, comprising an optical device for optically controlling an optical image of an object, an image pickup device disposed at the position of a focus of the optical device for converting an optical image into electric signals for a large number of divided dot-like regions on a plane, an image pickup device controller for controlling a manner in which electric signals produced by the image pickup device are to be taken out, and a printer device for printing out electric signals produced by the image pickup device.

Accordingly, a suitable optical image is produced by the optical device by suitably adjusting the angle and depth of field of an object for photographing in a similar manner as in a conventional camera, and then the optical image is divided into the plurality of dot-like regions by means of the image pickup device to produce corresponding electric signals, whereafter the electric signals are converted into signals of a signal aspect conforming to the printer device by the image pickup device controller, and then a hard copy of the signals is obtained by the printer device. Therefore, no step of displaying a picture image by means of an electronic display means such as a CRT is involved, and processing of signals proceeds such that an optical image produced by the optical device is recognized and converted into electric signals by the image pickup device and then the electric signals are directly converted into signals of a signal aspect conforming to the printer device. Accordingly, the processing is simple, and no special separate picture image storage means is required.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
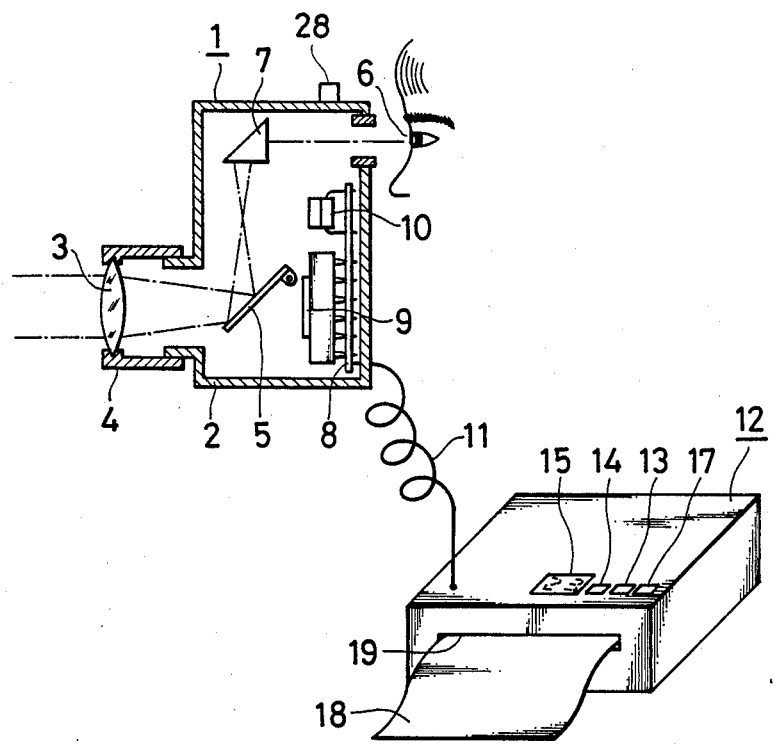
FIG. 1 is a schematic illustration, partly in section, of an image pickup printing system showing an embodiment of the present invention.
Figure 2:
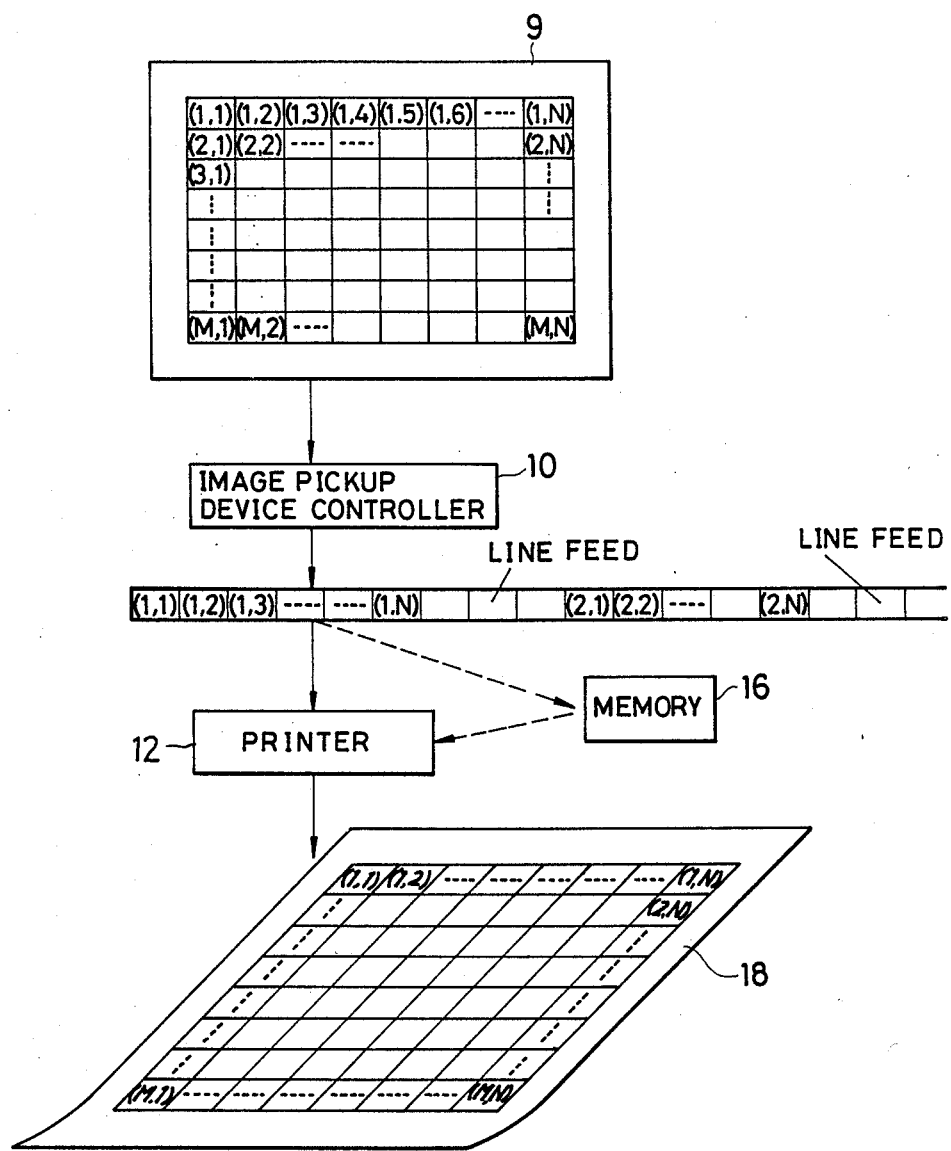
FIG. 2 is a flow chart illustrating a flow of signals in the image pickup printing system of FIG. 1.
Figure 3:
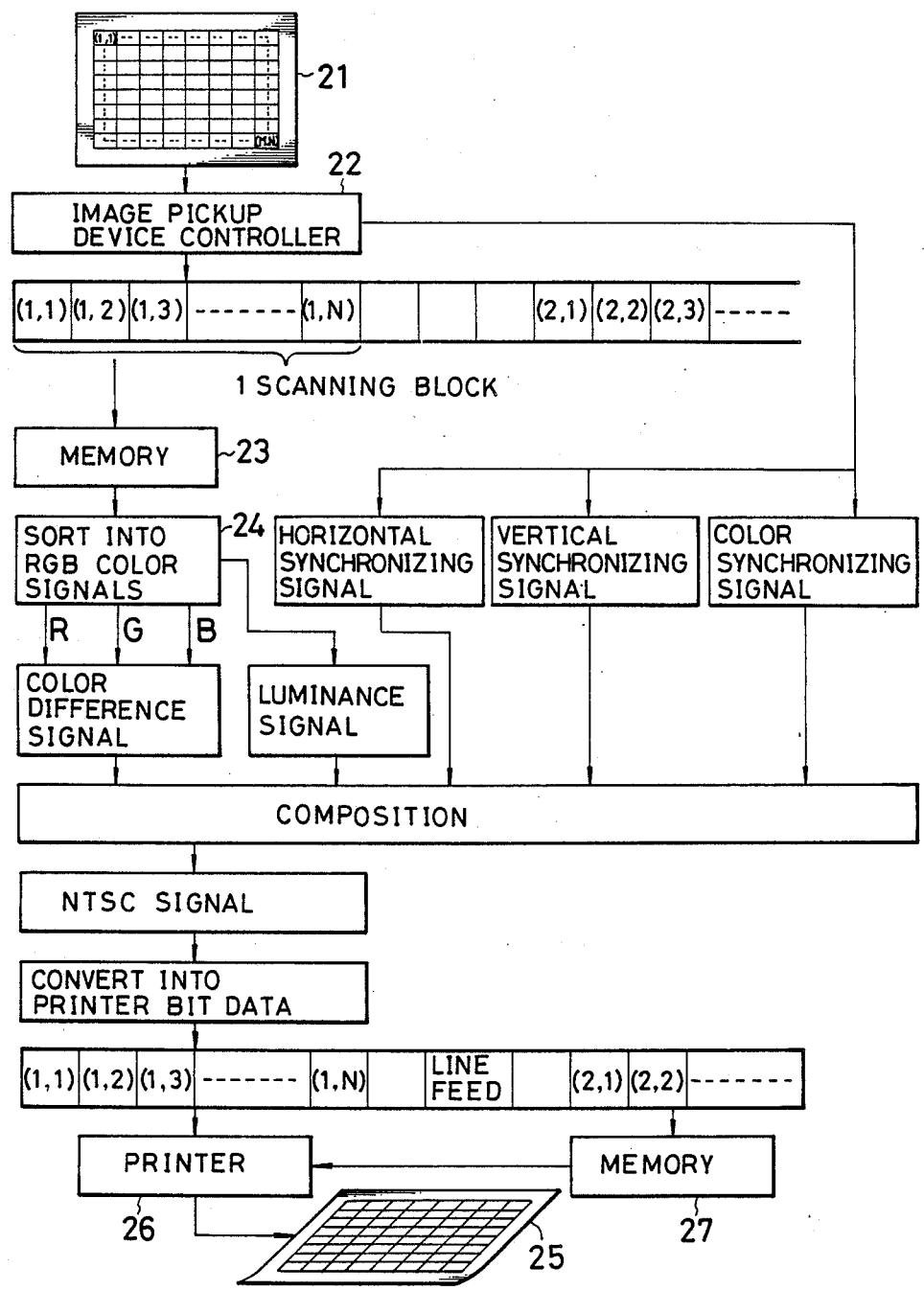
FIG. 3 is a block diagram illustrating a conventional electronic camera system.

Referring to FIGS. 1 and 2, there is shown an image pickup printing system according to a preferred embodiment of the present invention. The image pickup printing device shown includes an optical device 1 similar to a conventional camera. The optical device 1 includes a housing 2 and an interchangeable lens 3 mounted on a front wall of the housing 2. The lens 3 is actually mounted on a lens barrel 4 mounted for turning movement on the housing 2 such that an optical image to be produced by the lens 3 may be optically controlled by turning the lens barrel 4. Further, though not specifically shown, a diaphragm device connected to an adjusting ring is also disposed on a light path of the lens 3. Also a reflecting mirror 5 for changing the direction of an optical image is disposed on the light path of the lens 3 such that it may be pivoted upwardly and downwardly around an axis at an upper end thereof. A pentagonal prism 7 for introducing an optical image to an eye 6 of the photographer is located above the reflecting mirror 5.

A second push-button switch 28 for determining a timing at which a picture image is to be taken out is provided on an upper wall of the housing 2. The push-button switch 28 corresponds to a shutter of a conventional camera.

A PC plate 8 is located in the housing 2 adjacent a rear wall of the housing 2, and a CCD serving as an image pickup device is provided on the PC plate 8 and positioned at a focus of the lens 3. An image pickup device controller 10 for controlling a manner in which signals produced by means of the CCD are to be sent out is mounted on the PC plate 8.

A printer device 12 in the form of, for example, a laser printer is connected to the optical device 1 by a signal cable 11 connected to the PC plate 8. The printer device 12 has an internal structure similar to that of a conventional laser printer, and accordingly, description of the internal structure is omitted herein. The printer device 12, however, includes a first push-button switch 13 for determining a timing at which a picture image is to be taken out and instructing the printer device 12 of a hard copy, a copy number specifying button 14 for setting a number of hard copies, a copy number indicating device 15 for indicating a specified number of hard copies, and a copy switch 17 for causing the printer device 12 to print the stored contents of a memory 16 privided in the printer device 12, all located on an upper wall of the printer device 12. The first push-button switch 13 has the same function as the second push-button switch 28 described hereinabove. Meanwhile, an outlet port 19 for discharging a printed hard copy 18 therethrough is formed in a front wall of the printer device 12.

With the image pickup printing system having such a construction as described above, normally the housing 2 is fixed by means of a tripod or the like, and an operator will adjust the optical device 1 while observing an optical image of the pentagonal prism 7. In particular, the lens 3 is focused to an object for photographing and the amount of light is adjusted. In this instance, if the lens 3 should have an inappropriate angle of field, it should be replaced by another suitable lens.

After a picture image from which a hard coy 18 is to be obtained is determined, either the second push-button switch 28 located on the optical device 1 or the first push-button switch 13 located on the upper wall of the printer device 12 for determining a timing at which a picture image is to be taken out will be depressed. Consequently, the reflecting mirror 5 is jumped up so that an optical image passing the lens 3 is focused to form an image on the CCD 9. The CCD 9 is divided into M×N small regions including M rows and N columns and converts an amount of light at each of the regions into an electric signal of a corresponding quantity of electricity. Thus, as shown in FIG. 2, signals from (1, 1) to (M, N are delivered to the image pickup device controller 10.

The image pickup device controller 10 controls a manner in which the aforementioned electric signals produced by the CCD 9 are sent out. For example, the signals for the first line from (1, 1) to (1, N) are extracted in series and then a line feed signal is added, and after then, the signals for the second line from (2, 1) to (2, N). In this manner, the signals finally to (M, N) are sent out in series. The electric signals converted in this manner are inputted to and stored in the memory 16 and at the same time inputted to a printer of the printer device 12 by which they are printed out promptly. Thus, a hard copy 18 is obtained on which a picture image similar to the object for photographing is printed.

It is to be noted that, when a similar hard copy 18 becomes necessary later, the copy switch 17 should be depressed. Consequently, a similar hard copy 18 is produced in accordance with the signals stored in the memory 16.

Meanwhile, the signal aspect of electric signals by the image pickup device controller 10 can be changed depending upon the type of the printing device 12. In particular, while it is required in the case of a laser printer that the signals from (1, 1) to (M, N) are sent out in series as described hereinabove, in the case of a dot printer such as, for example, a thermal printer or an ink jet printer wherein a plurality of printing elements are disposed in a column, signals for a plurality of rows will be sent out at the same time.

It is to be noted that while in the embodiment described above the image pickup device controller 9 is described provided in the housing 2, it may otherwise be provided in the printer device 12. Further, while the housing 2 and the printer device 12 are interconnected by means of the signal cable 11, the signal cable 11, may be omitted while transmission of signals is effected making use of infrared rays or the like.

As described hereinabove, according to the present invention, an image pickup printing system comprises an optical device for optically controlling an optical image of an object, an image pickup device disposed at the position of a focus of the optical device for converting an optical image into electric signals for a large number of divided dot-like regions on a plane, an image pickup device controller for controlling a manner in which electric signals produced by the image pickup device are to be taken out, and a printer device for printing out electric signals produced by the image pickup device. With the image pickup printing system, a suitable optical image is produced by the optical device by suitably adjusting the angle and depth of field of an object for photographing in a similar manner as in a conventional camera, and then the optical image is divided into the plurality of dot-like regions on a plane by means of the image pickup device to produce corresponding electric signals, whereafter the electric signals are converted into signals of a signal aspect conforming to the printer device by the image pickup device controller. Accordingly, the image pickup printing system has various effects. In particular, a hard copy of the signals of the signal aspect conforming to the printer device can be obtained by the printer device. Further, since no step of displaying a picture image by means of an electronic display means such as a CRT is involved, processing of signals may be effected such that an optical image produced by the optical device is recognized and converted into electric signals by the image pickup device and then the electric signals are directly converted into signals of a signal aspect conforming to the printer device. Accordingly, since there is no step of converting the signals into NTSC signals or the like, the processing is simple. Besides, a hard copy can be obtained without requiring a special separate picture image storage means, and a matter written on a blackboard or the like can be obtained readily as a hard copy.

Having now fully described the invention, it will be apparent to one of ordinary skill in the art that many changes and modifications can be made thereto without departing from the spirit and scope of the invention as set forth herein.

What is claimed is:

1. An image pickup printing system, comprising:
   an optical system for focusing an image of an object;
   means for converting said image to a plurality of electrical signals being disposed at the focal position of said optical system, said means for converting including a matrix of regions with each region producing one of said plurality of electrical signals;
   means for controlling the transfer of said plurality of electrical signals to produce a serial signal formed of serially arranged signals corresponding to rows of said regions with the rows being separated by at least one signal indicating line feed, said serial signal having a format for directly driving a printing means;
   memory means connected to said means for controlling for receiving and storing said serial signal;
   printing means connected to said memory means and said means for controlling for printing said image wherein the serial signal is selectively received from said memory means and from said means for controlling.

2. An image pickup printing system according to claim 1, wherein a first switch is provided with said optical system and a second switch is provided at said printing means, said means for converting being responsive to both said first switch and said second switch to print an image.

* * * * *